CEILING ILLUMINATING SYSTEM
Original Filed June 27, 1960 3 Sheets-Sheet 1
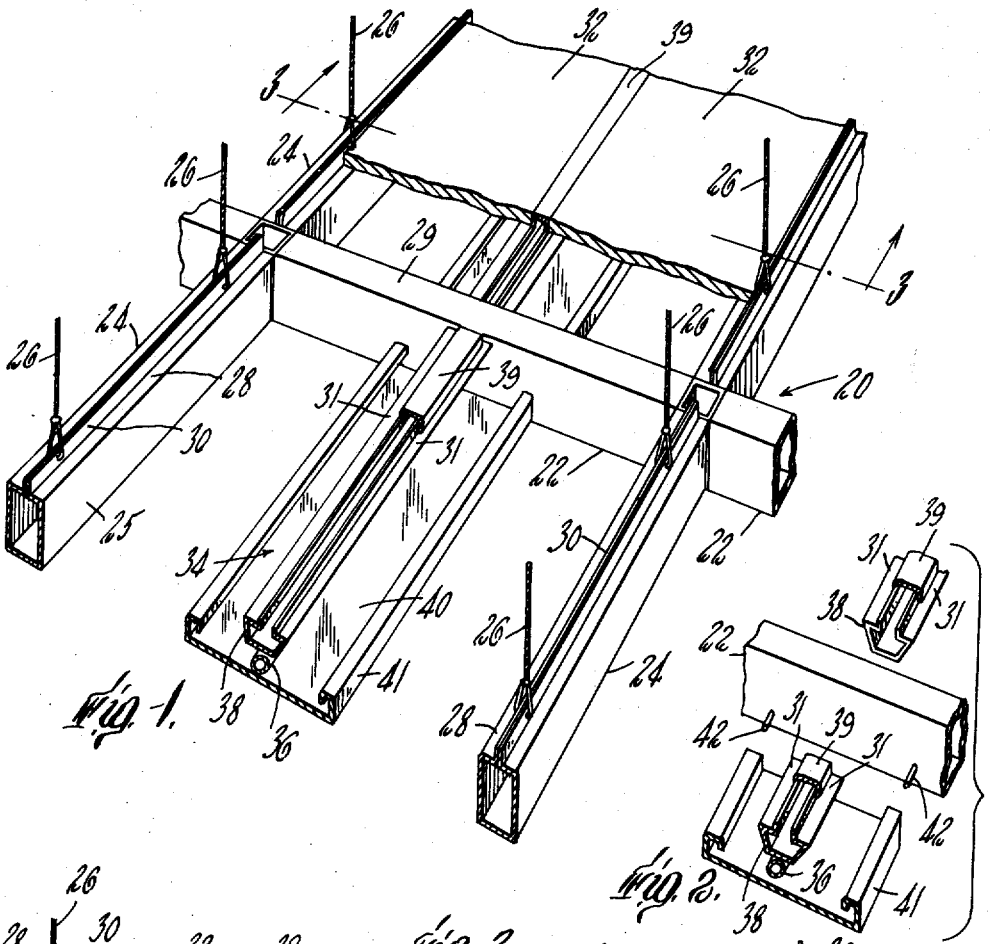
Fig. 1.
Fig. 2.
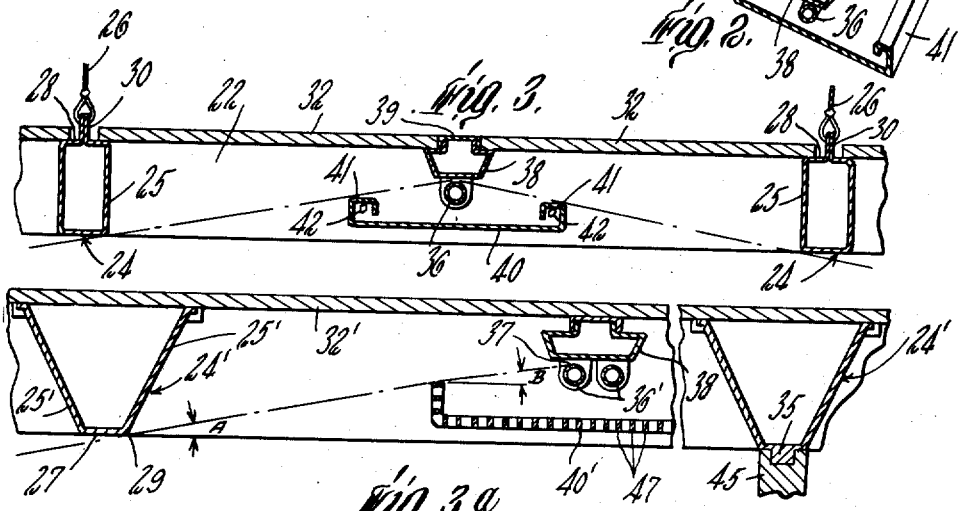
Fig. 3.
Fig. 3a

CEILING ILLUMINATING SYSTEM

Original Filed June 27, 1960 3 Sheets-Sheet 2

CEILING ILLUMINATING SYSTEM

Original Filed June 27, 1960 3 Sheets-Sheet 3

United States Patent Office

Re. 25,628
Reissued Aug. 4, 1964

25,628

CEILING ILLUMINATING SYSTEM

Michael Henry Kruger, Chestnut Hill, Mass., assignor to Smithcraft Corporation, Chelsea, Mass., a corporation of Massachusetts Original No. 3,094,285, dated June 18, 1963, Ser. No. 39,058, June 27, 1960. Application for reissue Dec. 19, 1963, Ser. No. 342,582
23 Claims. (Cl. 240—9)

Matter enclosed in heavy brackets [ ] appears in the original patent but forms no part of this reissue specification; matter printed in italics indicates the additions made by reissue.

The invention relates to lighting at ceilings and more particularly to lighting assemblies adapted to be mounted below overhead structure in rooms.

The apparent, visible ceilings of present-day rooms have been disposed considerably below the structural overhead when providing for air conditioning (including cooling and heating), and air ducts, and other services such as electrical power, telephone wiring and sprinkling systems are placed in the cavity thus defined, above the apparent ceiling and lighting means associated therewith.

Similarly, when it is desired to avoid having pendant light fixtures hanging down from the visible ceiling, while employing relatively inexpensive acoustical sheet for sound damping, the common practice has been to suspend the acoustical sheet across the room to define a planar ceiling, well below the structural overhead, and lighting fixtures have been recessed into the cavity.

While the dirt catching and unsightly pendant fixtures are thus eliminated, such has been achieved with a ceiling comprised of alternating, brilliantly-lighted zones, where the recessed lights appear, and dark zones, comprised of opaque, acoustical sheet. This creates risk of eyestrain to room occupants. Such ceilings have been considered to be so unattractive and otherwise unsuitable that luminous ceilings have been frequently employed, which are more expensive, and have often required more cavity space.

To provide a building with a given apparent ceiling height, building costs obviously greatly increase with increase of the depth of the "dead" cavity, and these costs are especially great where air conditioning is provided and where relatively more expensive ceiling arrangements are employed rather than opaque, acoustical sheet. Many existing buildings with low structural ceilings cannot practically be modernized along the lines suggested above.

A principal objective of the invention is, therefore, the provision of ceiling assemblies which overcome the above-mentioned disadvantages of the prior art. More particularly the invention has as one objective the decrease in needed cavity space in a well-illuminated, air conditioned room. Another objective is the better utilization of acoustical sheet material, so that it forms an attractive and functional secondary source of illumination, and the overall ceiling is devoid of eyestraining large contrasting brightness regions. Another objective is increase in apparent ceiling height in a room having an acoustical sheet ceiling and no pendant light fixtures.

Other objectives include providing a grid assembly of a strong and rigid construction having a number of integrated functions to achieve inexpensive, small cavity, combinations of even illumination, air conditioning, ready partitioning and acoustical damping; and a grid coupling means permitting rapid, economical, rigid and accurate on-site assembling.

These and other objects and features of the invention will be more fully appreciated with consideration of the following detailed description and drawings.

In the drawings:

FIG. 1 is a partially cutaway perspective looking down upon a portion of one embodiment of the ceiling according to the invention;

FIG. 2 is a partially exploded view of a portion of the ceiling of FIG. 1 illustrating the relationship of light and corresponding light shield;

FIG. 3 is a section of the ceiling of FIG. 1 taken on lines 3—3;

FIG. 3a is a view similar to FIG. 3 of another preferred embodiment;

Figure 4:
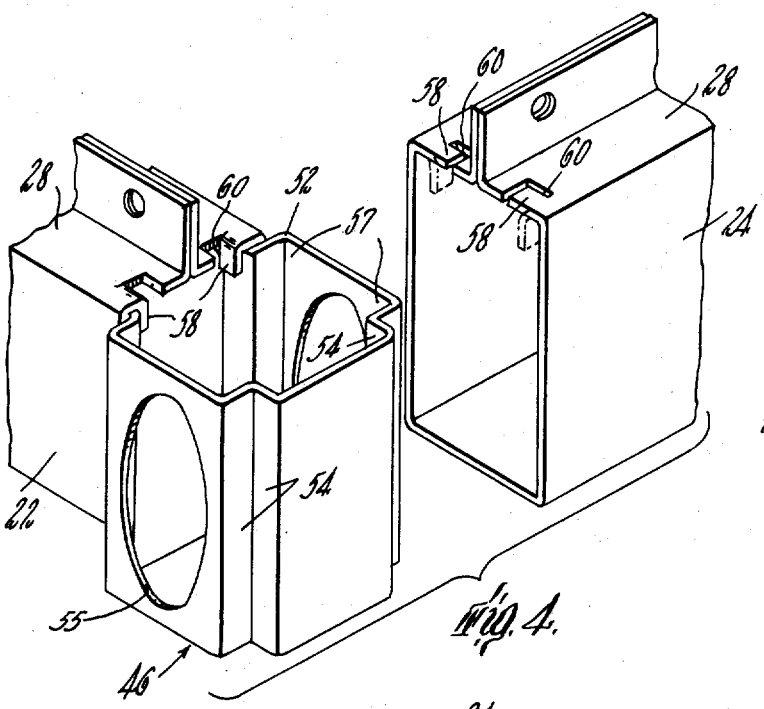
FIG. 4 is a partially exploded view on an enlarged scale of the interconnection of a juncture of grid members in the ceiling of FIG. 1.
Figure 6:
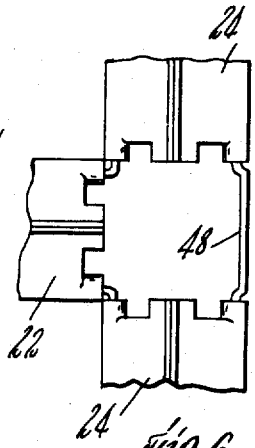
FIG. 6 is a view similar to FIG. 5 of the juncture of 3 grid members as occurs at the sides of the ceiling.
Figure 5:
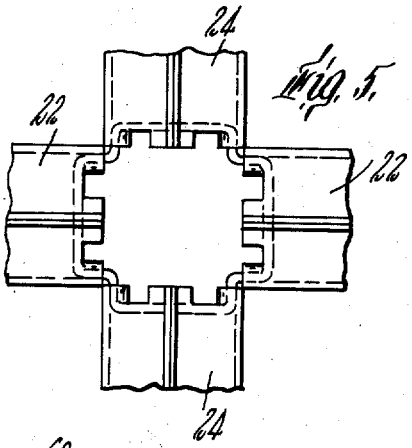
FIG. 5 is a section of a juncture of 4 grid members as occurs in central portions of the ceiling.
Figure 7:
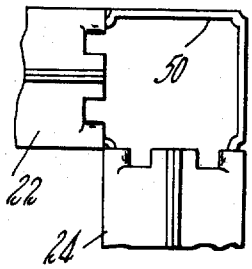
FIG. 7 is a view similar to FIGS. 5 and 6 illustrating a corner of the grid assembly.

The present-day common low-cost acoustical sheet ceilings noted above have been comprised of a suspended metal frame upon which acoustical sheet has rested generally flush with the lower surfaces of the framework. At spaced intervals fluorescent light fixtures have been recessed with lamp holders, lamps, and wiring well above the plane of the apparent acoustical ceiling. Such ceilings are dark, with bright areas only where the recessed lights occur. This results in eyestrain due to the variations in the ceiling brightness level. There is an inefficient use of light and poor appearance. In accordance with the teachings of the invention herein utilizing generally the same kinds and quantities of materials, there is provided a ceiling having a generally uniform brightness level illuminating the room below. There is achieved a ceiling, which, from a standpoint of illumination is competitively similar to the relatively very expensive lighting systems known as luminous ceilings. Moreover, a substantial increase in apparent ceiling height is achieved.

Referring to the preferred embodiment of FIG. 1, grid 20 is formed by a multiplicity of parallel, elongated grid members 24 suspended by wires 26 from overhead structure, connected with similar cross-grid members 22.

Each grid member is provided with horizontal upper ledges 28 and ledges 29 which may be divided in the center by upstanding longitudinal ribs 30 having spaced-part holes through which the supporting wires are secured, or may be smooth as suggested by the form of cross-grid member ledges 29, and supported by wires, vertical pipes or other such means engaging the grid members at the ledges or otherwise. Sheets 32 of acoustical material, e.g. sound-absorbent fiber, which may be acoustical board, rolled batting or other sheet means are horizontally disposed, supported at least in part by the ledges. Where employed, ribs 30 promote positioning of the sheets during assembling.

A plurality of fluorescent light tube means 34 are supported between pairs of grid members 24, parallel therewith below ledges 28 and 29 and sheets 32. In the efficient use of materials of the embodiment of FIG. 1, cross-grid members 22, positioning grid members 24 also support ends of the light tube means.

Each light tube means is comprised of at least one tubular fluorescent bulb 36 and appropriate electrical connections, e.g. opposed lamp holders and a formed metal strip 38, carrying ballast and wiring. In this preferred embodiment the metal strip provides ledges 31 which may be similar to ledges 28, 29 for support of sheet 32. An elongated closure 39 overlies and closes the strip 38.

A light-shielding member 40 comprised preferably of optically treated plastic is disposed below each bulb 36 and is likewise preferably supported by opposed cross grid members 22. The light-shielding members 40 extend longitudinally with the bulbs and have a substantially transverse dimension, relative to the bulb, with each longitudinal extremity 41 thereof disposed substantially to the side from the corresponding side of the bulb. The longitudinal extremities 41 can be comprised of integral, upturned portions, with overlying margins adapted to rest upon supporting pins 42 held by cross grid members 22, see FIG. 2. The light-shielding member has a refracting characteristic, the horizontal surface directs incident light steeply downward, and the upturned sides direct light toward the grid members 24.

The grid members 24 are provided with downward extending, longitudinal surfaces 25 parallel with the fluorescent tubes 36.

Referring to FIG. 3, the lower longitudinal edges of grid member downward-extending surfaces 25, the longitudinal edges of light-diffusing shields 40 and the bulbs 36 are aligned as indicated so that rays from the bulb passing laterally, clear of the light-shielding member impinge either upon grid member surfaces 25 or the undersurface of sheets 32, hence no bare bulb is exposed to view from below. The grid member surfaces 25 and the undersurface of the acoustical sheets 32 are provided with a light-reflecting finish, and, being thus illuminated by the light tube means, provide secondary illumination to the room, in a ceiling of generally even brightness. The shielding member may transmit direct relatively high level illumination, but in rays at such steep angles that they are not observable in looking at the ceiling with normal angles of view.

Both grid members 24 and the cross-grid members in this preferred embodiment are box-formed sheet metal channels defining longitudinal passages through which wiring can be easily run, and provide double-walled sound barriers.

The hollow box cross section of the grid members makes the grid members rigid, self-supporting, and uniquely adapted to be interengaged with couplers to provide a strong, rigid and accurately aligned ceiling grid, as hereafter discussed with reference to FIGS. 4–7.

Referring to FIG. 3a, grid members 24' have downwardly extending, opposed surfaces 25' flaring outwardly from narrow undersurface 27, either flat or rounded, the only portion not exposed to direct light. Indeed, in some instances this could be a V point in cross section, eliminating even this thin line of shadow, but the thin shadow line gives a desirable texture to the ceiling, permits substantial volume to be enclosed by the grid member, important for instance for passage of air as hereafter described, and does not cause eyestrain.

The light means here comprises a pair of light tubes 36' and the light-shielding member 40' comprises a planar-diffusing member comprised of vertically arranged, intersecting strips 47. It will be noted that this light-shielding member is open permitting air to pass therethrough and the above acoustical sheet is thus advantageously exposed to sound for damping. Each grid member along a bulb serves as a light cutoff. Lower horizontal edge 29 of each of such grid members is on a line of sight with the lateral extremity of the light-shielding member 40', intersecting the horizontal at an angle A. A line of sight between that light-shielding member extremity and the upper limb 37 of the adjacent light means intersects the horizontal at smaller angle B, hence eyestraining bare bulb is not visible from below, between the corresponding edges of the shielding member and the grid member. Where, however, the comfort requirements of a room require that only light radiated at slight angles to the horizontal be cut off, or where relatively close spacing of parallel grid members 24 or 24' can be employed, e.g. to house building services as hereafter discussed, the grid members 24 are employed alone, without light-shielding members, and serve as light cutoffs as suggested by the cutaway of FIG. 3a. Indeed, cross-grid members 22 similarly serve to promote comfort by light cutoff, and the grid alone will block all direct light radiating towards remote points on the floor below, and hence is particularly advantageous in very large, low ceilinged rooms.

The undersurface of the right hand grid member in this figure is provided with an elongated, downwardly extending rib 35 engaged with a matching groove in the head of wall partition 45, positioning and securing it.

Referring to FIGS. 4–7, central coupler 46, side coupler 48 and corner coupler 50 each is provided with plug portions 52 adapted to engage internally end-connected grid members 24 and also cross-grid members 22, see FIG. 4. These plug portions have perimeter dimensions substantially the same as the internal dimensions of the grid members. Plugs on either side of one plug provide abutment shoulder means adapted to be abutted by grid member and engaging that plug. Each plug has a substantial outward extent in contact with corresponding inner surface portions of its grid member. Thus a five-sided snug fit between a grid member end and its coupler is achieved. They are locked together by means of tabs 58 struck from portions of the grid member, preferably ledge 28, overlying a hollow horizontal end of the coupler. During assembling these tabs are bent into the hollow of the coupler and interior edge 60 of each of the tabs engages the inner surface 57 of the plug end, locking coupler and grid member from relative movement. Thus adjacent grid members are rigidly and rapidly locked together during on-site assembling.

Figure 8:
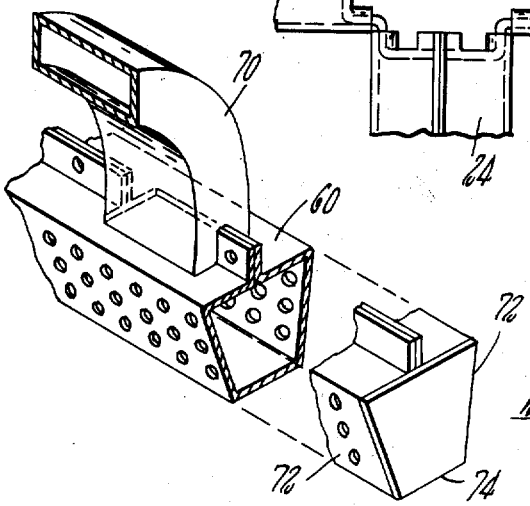
FIG. 8 is illustrative of a novel grid member adapted to serve as acoustical sheet support, as a light reflector and cutoff and as an air register.

Holes 55 are provided in plug ends providing, when desired, communication between grid members at the connections. While shown to be oval, adequate for low air flow, where higher flows are involved the holes are shaped to minimize air flow resistance and sound. An insert 59 (see FIG. 10) is inserted in the bottom hollow end of each coupler to enhance appearance, and for air sealing. It will be appreciated that since a large number of grid members are advantageously employed in a room, the air flow through each can be small, hence pressure drop and noise will be minimized, and dirt discoloration at the outlets avoided. The unique couplers are adapted to turn the air from grid members 24 to cross-grid members 22, hence air distribution can be in any desired pattern, and can be changed as needed when the room partitioning is rearranged. Thus there are important functions the grid members perform in addition to the serving as light cutoff and together with the sheet 32, serving as source of secondary illumination. As in FIG. 8 a grid member 60 is provided with perforated sides and an air duct 70 is connected from above, and the grid member serves as an air register. The upper portions of these grid members are quite wide providing a substantial air capacity. The downward extending sides 72 converge inwardly to a relatively narrow undersurface 74. As these sloped sides are exposed to illumination, dark ceiling portions are limited to the narrow ceiling texturing undersurfaces while a large grid member volume is achieved.

Figure 9:
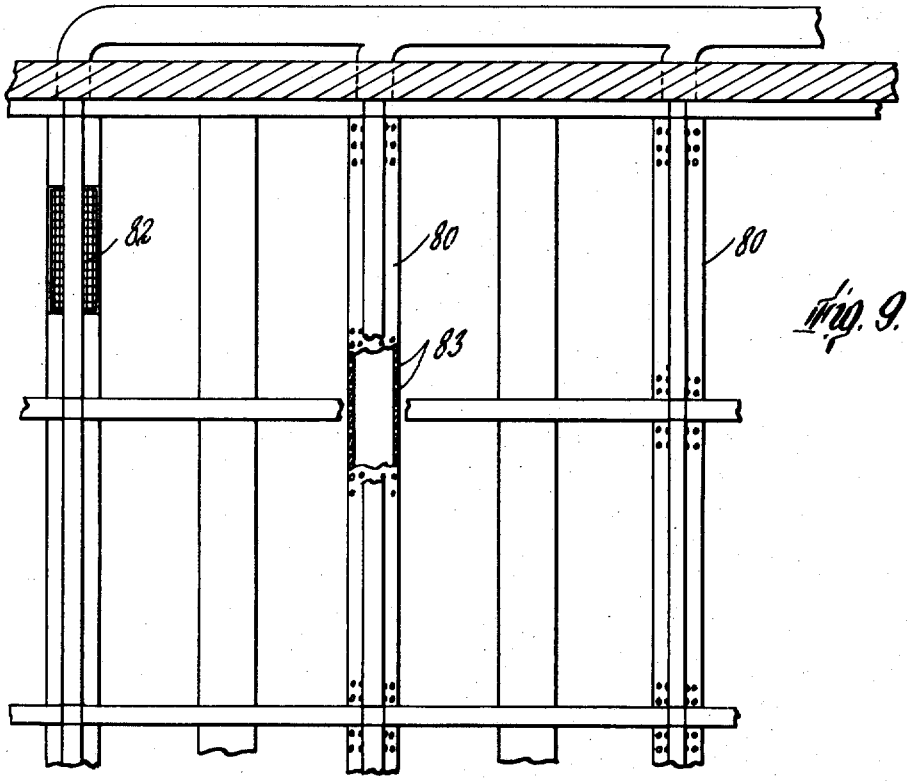
FIG. 9 is a view from below of a variation of the system of FIG. 1 wherein grid members parallel with the tubular light are of substantial volume similar to the grid members of FIG. 8, and in which successive grid members are in end-to-end communication serving as ducts for transmission of air as well as providing air registers.

Referring to FIG. 9 grid members 80 have substantially the same cross section, but here serve as air ducts as well as being provided with air register means including air register grilles 82 and opening 83 in the grid sides, transmitting air across the room to outlets. Couplers similar to those described above are employed, air passage holes being provided in the coupler plug-end walls inserted in duct grid members.

Figure 10:
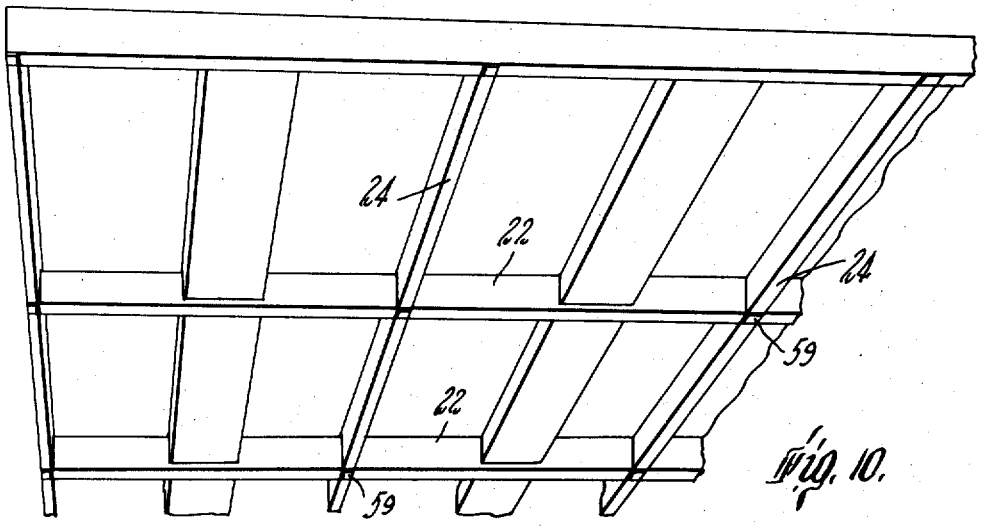
FIG. 10 is a partially cutaway view from below of the integrated illuminated ceiling of FIG. 1.

Referring to FIG. 10, it will be appreciated that the ceiling of the invention achieves an apparent ceiling height which is virtually the uppermost extent of the assembly itself. Thus it is possible to avoid waste cavity space, and to lower the structural overhead in new construction, achieving substantial savings in building materials. For the first time it is now practical to modernize old low ceiling buildings in a relatively inexpensive manner. From the view of FIG. 10, it will also be appreciated that room partitions of a thickness equal to the grid members 22, 24 can be set in place throughout the room, reaching to the ceiling with no changes in the ceiling lighting being necessary. Such partitions are anchored at the top to grid members adapted to the purpose, see FIG. 3*a*. It will also be appreciated that the bulbs are exposed for maintenance, the light-shield members 40 being removed by simply sliding them to one side while pushing slightly upwards (see FIG. 3).

Finally, it will be appreciated that each of these grid members can carry building services. Within a grid member a sprinking system can be installed therethrough. An intercommunication speaker system adapted to play music, complete with wiring can be installed. Special high intensity spotlights can be installed and wired. And very importantly, a low flow, even air distribution system is provided, which uniquely can be changed to adequately ventilate cubbyholes partitioned off, whenever desired, and all of this is achieved with a ceiling that can in fact be the structural overhead, to which can be applied a sheet of sound damping material.

It will be understood that the foregoing are descriptions and drawings of preferred embodiments and various details thereof can be modified within the spirit and scope of the invention.

I claim:

1. An illuminating, sound-absorbent ceiling comprising a multiplicity of elongated grid members adapted to be suspended horizontally from overhead structure, each grid member being provided with an elongated upper surface, acoustical sheet means having a light reflective lower surface disposed over and supported at least in part by said grid member upper surfaces, at least some of said grid members being spaced apart from and parallel with adjacent grid members forming a plurality of grid member pairs, a plurality of elongated light tube means, means supporting each light tube means between a said pair of grid members and parallel therewith below said lower surface of said acoustical sheet means, each grid member disposed along the side of a light tube means having a generally continuous surface parallel with the corresponding light tube means and extending downwardly to a lower horizontal edge below said light tube means, a plurality of light-shielding means, one disposed below, along the length of each light tube means, each light-shielding means being substantially narrower than the space between the grid members of the corresponding pair but wider than the corresponding light tube means, having each longitudinal upper edge spaced aside from the corresponding side of said light tube means, each light tube means, its light-shielding means, and the corresponding pair of grid members being relatively positioned so that a line of sight through each light-shielding means longitudinal upper edge and the lower inner edge of the corresponding grid member intersects the horizontal at an angle no less than that of a line of sight between that shielding means edge and the upper limb of the corresponding light tube means.

2. The ceiling of claim 1 wherein at least some of said gird members define hollow longitudinal chambers, each provided with an air inlet means and an air outlet means, thereby serving as a portion of the air service system.

3. The ceiling of claim 2 wherein the air inlet means of some of said hollow grid members comprise other of said hollow grid members in direct end communication therewith.

4. The ceiling of claim 2 wherein the outlet means of at least one of said gird members is an air register means provided in a longitudinal wall of said grid member.

5. The ceiling of claim 1 wherein a plurality of said light tube means are disposed in a parallel relationship across said ceiling, spaced alternately with parallel grid members, those gird members positioned between light tube means being shared grid members providing two generally oppositely directed, downwardly extending surfaces, one disposed toward each of said light tube means.

6. The ceiling of claim 5 wherein at least some of said shared grid members have two spaced-apart walls providing said two downwardly extending surfaces, said grid members further being provided with additional longitudinal, enclosing wall portions, thereby defining hollow grid member enclosures adapted to serve as a housing for building services.

7. The ceiling of claim 1 wherein said light-shielding means comprises an optically treated plastic member having a horizontal surface portion adapted to refract light steeply downwards, and having upstanding side portions comprising the lateral extremities adapted to refract light towards corresponding grid member downwardly-extending surfaces.

8. The ceiling of claim 1 wherein undersurfaces of at least some of said grid members are each provided with a longitudinal engagement means, adapted to engage with the upper edge portions of room partitions for positioning and support thereof without disrupting the light and appearance of the ceiling.

9. For use as an illuminating, sound-absorbent ceiling, a pair of parallel, spaced-apart, elongated grid members adapted to be disposed in a horizontal plane, each grid member having a longitudinal surface extending downwardly to a horizontal lower longitudinal edge, a generally planar sound-absorbent means disposed horizontally at a level above said grid member surfaces and positioned between them, the lower surface of said sound-absorbent means being light-reflective, an elongated light tube means mounted parallel with and between said grid members, below said sound-absorbent means and above said lower longitudinal edges of said grid members, and an elongated light shielding means disposed under said light tube means, said shielding means being adapted to prevent the transmission of glaring direct light into the eyes of persons below said ceiling, said shielding means being wider than said light tube means but narrower than the space between said grid members leaving portions of said light-reflective surface of said sound-absorbent means unshielded, the longitudinal edges of said shielding means being spaced outwardly from the corresponding sides of said light tube means, said light tube means, its light-shield means and said grid members being relatively positioned so that a line of sight through each longitudinal upper edge of said light-shielding means and the lower longitudinal inner edge of the corresponding grid member intersects the horizontal at an angle no less than that of the line of sight between that shielding means edge and the upper limb of the light tube means.

10. The ceiling of claim 9 wherein said unshielded portions of said light-reflective surface of said sound-absorbent means are exposed to direct upwardly traveling rays of light from said light tube means.

11. The ceiling of claim 9 wherein at least one of said grid members adjacent said elongated tube means and in said line of sight alignment with said light-shielding means is hollow defining a longitudinal passage, said grid member being provided with an air inlet means and an air outlet means.

12. The ceiling of claim 9 wherein at least one of said gird members is hollow, having an air register means provided in a longitudinal surface thereof, said one grid member being connected to an in communication with a further hollow grid member in said ceiling, said further grid member being connected to a supply of air, and discharging into said grid member having said air register means.

13. The ceiling of claim 10 wherein said light shield means refracts downwardly passing light to move at steeper angles to the horizontal.

14. A ceiling assembly adapted to be supported by overhead structure in a position below a horizontal light-reflective ceiling surface, said assembly comprising a multiplicity of elongated grid members connected together, a first group of said grid members being arranged in spaced-apart, parallel lines and a second group extending at right angles thereto, a plurality of elongated light tube means each parallel with and between a pair of parallel grid members of said first group, supported by grid members of said second group extending at right angles thereto, the parallel grid members of said first group adjacent said light tube means each having a generally continuous surface parallel with its light tube means and extending downwardly to a lower longitudinal horizontal edge below said light tube means, at least some of said grid members being hollow and adapted to convey air for ventilation, the outer surfaces of the grid members of said first group directed toward said light tube means being light-reflective, each light tube means having a parallel elongated light shield means disposed under it, each said light shield means being narrower than the spacing between the grid members of said first group lying adjacent thereto, and being wider than the corresponding light tube means, the longitudinal upper edges of said shield means spaced outwardly from the corresponding sides of said light tube means, each light tube means, its light shield means and the corresponding parallel pair of grid members of said first group being relatively positioned so that a line of sight through each light shield means longitudinal upper edge and the lower longitudinal inner edge of the corresponding grid member intersects the horizontal at an angle no less than the line of sight between that shield means edge and the upper limb of the corresponding light tube means.

15. The ceiling assembly of claim 14 wherein ends of hollow grid members are connected together with the volume of one in communication with the volume of another, one grid member connected to a source of ventilating air and discharging into the other grid member in communication therewith.

16. The ceiling assembly of claim 14 wherein at least some of said hollow grid members each is defined by relatively rigid thin walls providing a narrow undersurface, opposite, outwardly flaring side walls, and an upper longitudinal closing surface means cooperating to provide a ceiling of generally even brightness while providing a large air passage cross section.

17. The ceiling assembly of claim 14 wherein each of said grid members is provided with an upper supporting surface for supporting overlying acoustical sheet means.

18. The ceiling assembly of claim 16 wherein at least some of said grid members have undersurfaces each defining an elongated engagement means adapted to engage for positioning and support upper edge portions of room partitions.

*19. An integrated illuminating, sound-absorbent ceiling comprising a multiplicity of elongated grid members adapted to be suspended in parallel, spaced-apart relation from overhead structure forming a plurality of spaced-apart grid member pairs, each grid member provided with an elongated upwardly directed support surface and an elongated bottom edge, opaque acoustical sheet members*

*having light-reflective lower surfaces disposed over and supported in part by said upwardly directed surfaces of said grid members, each sheet member extending in an overlying relation relative to the space between a pair of grid members, a plurality of elongated light source means, each light source means associated with a said pair of grid members, an elongated strip member associated with each light source means, adapted to support said light source means therebelow, said strip member positioning said light source means above said elongated bottom edges of said grid members, parallel therewith, and generally midway therebetween, said strip members providing upwardly directed support surfaces located in the vicinity of said light source means, engaging for support the corresponding acoustical sheet members, each light source means and the corresponding pair of grid members being relatively positioned so that the bottom edges of said grid members define cut-off lines for light passing directly from said light source means at a predetermined small downward angle to the horizontal, to shield said light source means from direct view from the working area at angles to the horizontal smaller than said predetermined angle, said acoustical sheet members having major portions of their said lower surfaces extending from said supporting strip members to said supporting grid members exposed directly to illumination from said light source means, and exposed unimpededly to the working area therebelow, whereby said opaque acoustical sheet members serve as secondary sources of illumination to said working area, while said supporting grid members for said acoustical sheet members cut off glare from said ceiling.*

*20. The ceiling of claim 19 wherein each light source means includes at least one elongated light tube and an elongated shield means disposed below each light tube, each shield means constructed and arranged in cooperation with the remaining elements of said ceiling to prevent direct view of said light tube at normal viewing angles from said working area, said shield means being sufficiently narrow to maintain said acoustical sheet members unimpededly exposed to said working area.*

*21. The ceiling of claim 19 having integral means defining air passages for communication with the work space therebelow whereby said ceiling, as a single unit supported from overhead structure, serves the integrated functions of illumination, air supply and acoustical damping.*

*22. The ceiling of claim 21 wherein at least some of said grid members are hollow and define said air passages*

*23. The ceiling of claim 19 wherein a pair of cross grid members is connected with a said pair of grid members, said cross-grid members spaced-apart and disposed at right angles to said grid members, said cross grid members defining a pair of elongated bottom edges positioned to cut-off light passing directly from said light source means at a predetermined small downward angle to the horizontal, said cross-grid members providing upwardly directed support surfaces engaging and supporting corresponding portions of said opaque acoustical sheet members.*

References Cited in the file of this patent or the original patent

UNITED STATES PATENTS

| | | |
|---|---|---|
| 2,097,580 | Tarbell | Nov. 2, 1937 |
| 2,659,807 | Wakefield | Nov. 17, 1953 |
| 2,659,808 | Beckwith | Nov. 17, 1953 |
| 2,781,110 | Weller et al. | Feb. 12, 1957 |
| 2,803,741 | Guth | Aug. 20, 1957 |
| 2,833,199 | Wakefield | May 6, 1958 |
| 2,888,113 | Schwartz et al. | May 26, 1959 |
| 2,956,150 | Schwartz et al. | Oct. 11, 1960 |